United States Patent
Sun et al.

(10) Patent No.: US 11,656,489 B2
(45) Date of Patent: May 23, 2023

(54) MOLD FRAME, BACKLIGHT MODULE, AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Hanyan Sun, Beijing (CN); Hui Zheng, Beijing (CN); Xiaohu Li, Beijing (CN); Minghui Zhang, Beijing (CN); Inho Park, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 272 days.

(21) Appl. No.: 17/096,706

(22) Filed: Nov. 12, 2020

(65) Prior Publication Data

US 2021/0141263 A1 May 13, 2021

(30) Foreign Application Priority Data

Nov. 12, 2019 (CN) .......................... 201921953560.3

(51) Int. Cl.
*G02F 1/1333* (2006.01)

(52) U.S. Cl.
CPC .... *G02F 1/133308* (2013.01); *G02F 1/13332* (2021.01); *G02F 1/133314* (2021.01); *G02F 1/133317* (2021.01)

(58) Field of Classification Search
None
See application file for complete search history.

(56) References Cited

U.S. PATENT DOCUMENTS

2015/0160405 A1\* 6/2015 Park ..................... G02B 6/0085
362/606

\* cited by examiner

*Primary Examiner* — Phu Vu
(74) *Attorney, Agent, or Firm* — Procopio, Cory, Hargreaves & Savitch LLP

(57) ABSTRACT

A mold frame includes a bottom frame, a side frame and at least one position-limiting structure. The bottom frame has an opening. The side frame is disposed on a periphery of the bottom frame. The at least one position-limiting structure is disposed on a first inner side wall of the side frame. The position-limiting structure has a first side wall that is in direct contact with the first inner side wall of the side frame, and a second side wall opposite to the first side wall. The second side wall includes two surfaces that are arranged along a thickness direction of the bottom frame, and the two surfaces are connected. At least one of the two surfaces is inclined with respect to the first side wall, and a first angle, facing the first side wall, between two planes where the two surfaces are located is an obtuse angle.

20 Claims, 20 Drawing Sheets

MOLD FRAME, BACKLIGHT MODULE, AND DISPLAY APPARATUS

CROSS-REFERENCE TO RELATED APPLICATION

This application claims priority to Chinese Patent Application No. 201921953560.3 filed on Nov. 12, 2019, which is incorporated herein by reference in its entirety.

TECHNICAL FIELD

The present disclosure relates to the field of display technologies, and in particular, to a mold frame, a backlight module and a display apparatus.

BACKGROUND

A liquid crystal display apparatus is an apparatus which includes two opposite substrates and a liquid crystal layer between the two opposite substrates, and which displays images through the electro-optic effect. The liquid crystal display apparatus has the advantages of high color gamut, lightweight, small thickness, and fast response time.

SUMMARY

In one aspect, a mold frame is provided. The mold frame includes a bottom frame, a side frame, and at least one position-limiting structure. The bottom frame has an opening. The side frame is disposed on a periphery of the bottom frame. The at least one position-limiting structure is disposed on a first inner side wall of the side frame. The position-limiting structure has a first side wall that is in direct contact with the first inner side wall of the side frame, and a second side wall opposite to the first side wall. The second side wall includes two surfaces that are arranged along a thickness direction of the bottom frame, and the two surfaces are connected. At least one of the two surfaces is inclined with respect to the first side wall, and a first angle, facing the first side wall, between two planes where the two surfaces are located is an obtuse angle.

In some embodiments, the at least one position-limiting structure includes a plurality of position-limiting structures that are spaced apart.

In some embodiments, at least one of the plurality of position-limiting structures is disposed at a corner of the side frame.

In some embodiments, the at least one position-limiting structure includes one position-limiting structure extending along a length direction of the first inner side wall of the side frame to two ends of the first inner side wall, and the one position-limiting structure is connected to position-limiting structures disposed on second and third inner side walls, adjacent to the first inner side wall, of the side frame.

In some embodiments, the mold frame further includes fixing members each of which is connected to the side frame and/or the bottom frame, and the fixing members are configured to fix the mold frame.

In some embodiments, each fixing member includes a first support plate and a second support plate. The first support plate includes a horizontal portion and a vertical portion. The horizontal portion is parallel to a first surface of the bottom frame directly connected to the first inner side wall, and one end of the horizontal portion is connected to a corresponding outer side wall of the side frame, and an opposite end of the horizontal portion is connected to the vertical portion. The vertical portion extends along the thickness direction of the bottom frame. The second support plate is connected to a second surface of the bottom frame opposite to the first surface of the bottom frame, and extends along the thickness direction of the bottom frame, so that the fixing member, the side frame and the bottom frame constitute a U-shaped structure.

In some embodiments, the at least one position-limiting structure, the bottom frame, the side frame and the fixing members are integrally formed.

In some embodiments, one of the two surfaces is parallel to the first side wall, and another surface of the two surfaces is inclined with respect to the first side wall.

In some embodiments, the two surfaces are connected through a curved surface, and an orthographic projection of the curved surface on a plane perpendicular to both the first side wall and a first surface of the bottom frame directly connected to the first side wall is a curved line segment that has a radius of curvature that ranges from approximately 0.5 mm to approximately 2 mm.

In some embodiments, the first angle ranges from approximately 150 degrees to approximately 160 degrees.

In some embodiments, the at least one position-limiting structure, the bottom frame and the side frame are integrally formed.

In another aspect, a backlight module is provided. The backlight module includes the mold frame in any one of the embodiments as above, a back plate matched with the mold frame, and a backlight assembly. The back plate is disposed on a side of the bottom frame away from the side frame, and the backlight assembly is disposed within an accommodating space enclosed by the back plate and the mold frame.

In yet another aspect, a display apparatus is provided. The display apparatus includes the backlight module in any one of the embodiments as above and a display panel. The display panel is disposed within another accommodating space enclosed by the bottom frame and the side frame, and the position-limiting structure is configured to limit a position of the display panel.

In some embodiments, the display panel is a liquid crystal display panel, and the liquid crystal display panel includes an array substrate and an opposite substrate that are sequentially arranged in a direction away from the bottom frame.

In some embodiments, in the thickness direction of the bottom frame, a first distance between a line at which the two planes where the two surfaces are located intersect and a first surface of the bottom frame directly connected to the first inner side wall is less than a second distance between a surface of the array substrate facing away from the bottom frame and the first surface of the bottom frame.

In some embodiments, the first distance is n times the second distance, where n ranges from approximately 0.5 to approximately 0.8.

In some embodiments, an edge of the opposite substrate exceeds a corresponding edge of the array substrate. The two surfaces of the second side wall include a first surface and a second surface that is connected to the first surface of the bottom frame. The first angle is less than $$\left[180° - \arctan\left(\frac{\Delta d}{D-H}\right) - (90° - \beta)\right]$$

degrees, where H is the first distance, D is the second distance; β is a second angle, facing the array substrate, between a first plane where the second surface is located and the first surface of the bottom frame; and Δd is a horizontal distance between the edge of the opposite substrate and a line segment at which the second side wall comes into contact with a side face of the array substrate after the liquid crystal display panel abuts against the position-limiting structure.

In some embodiments, an edge of the array substrate exceeds a corresponding edge of the opposite substrate. The two surfaces of the second side wall include a first surface and a second surface that is connected to the first surface of the bottom frame. The first angle is less than or equal to a sum of a second angle, facing the array substrate, between a first plane where the second surface is located and the first surface of the bottom frame, and a third angle, facing the position-limiting structure, between the first surface of the bottom frame and a side face of the array substrate.

In some embodiments, the two surfaces of the second side wall include a first surface and a second surface that is connected to the first surface of the bottom frame. A sum of a second angle, facing the array substrate, between a first plane where the second surface is located and the first surface of the bottom frame, and a third angle, facing the position-limiting structure, between the first surface of the bottom frame and a side face of the array substrate is less than or equal to 180 degrees.

In some embodiments, the display apparatus further includes a front frame surrounding the back plate. The front frame has an opening facing a display area of the display panel, and a remaining portion of the front frame covers a peripheral area of the display panel.

BRIEF DESCRIPTION OF THE DRAWINGS

In order to describe technical solutions in embodiments of the present disclosure more clearly, the accompanying drawings to be used in some embodiments of the present disclosure will be introduced briefly. However, the accompanying drawings to be described below are merely accompanying drawings of some embodiments of the present disclosure, and a person of ordinary skill in the art may obtain other drawings according to these drawings without paying any creative effort. In addition, the accompanying drawings to be described below may be regarded as schematic diagrams, and are not limitations on an actual size of a product, an actual process of a method and an actual timing of signals to which the embodiments of the present disclosure relate.

DETAILED DESCRIPTION

Figure 1A:
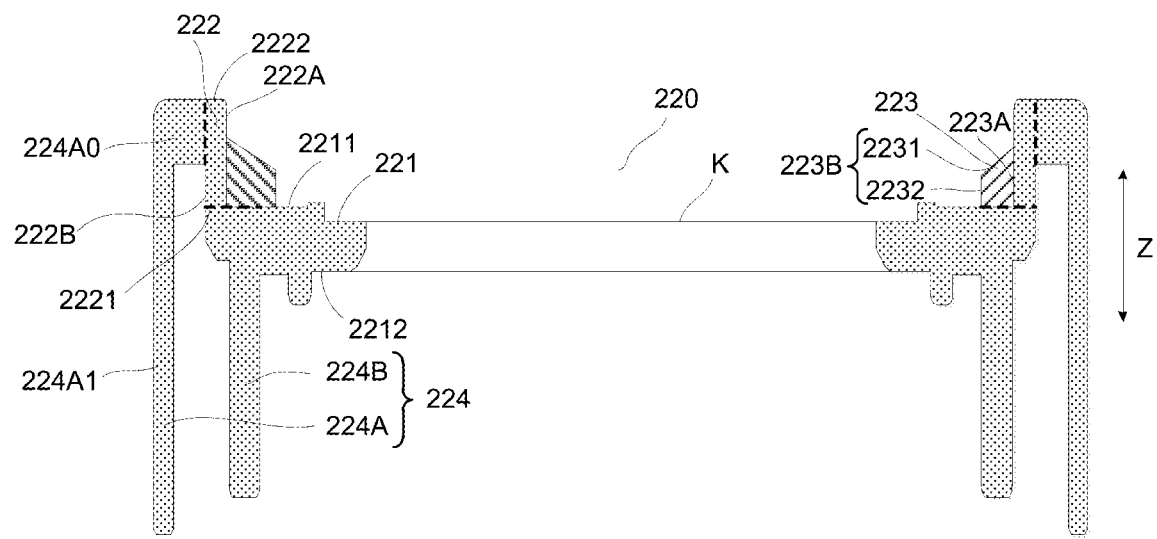
FIG. 1A is a sectional view of a mold frame, in accordance with some embodiments of the present disclosure.

Technical solutions in some embodiments of the present disclosure will be described clearly and completely with reference to accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the entire description and the claims, term "comprise" and other forms thereof such as the third-person singular form "comprises" and the present participle form "comprising" are construed as open and inclusive, i.e., "including, but not limited to". In the description, terms such as "one embodiment," "some embodiments," "exemplary embodiments," "example," "some examples," or "specific example" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

In addition, terms such as "first" and "second" are used for descriptive purposes only and are not to be construed as indicating or implying relative importance or implicitly indicating the number of indicated technical features below. Thus, features defined by "first" and "second" may explicitly or implicitly include one or more of the features. In the description of the embodiments of the present disclosure, the terms "a plurality of," "the plurality of," and "multiple" mean two or more unless otherwise specified.

In the description of the embodiments of the present disclosure, it will be understood that orientation or positional relationship indicated by terms "center," "upper," "lower," "front," "rear," "left," "right," "vertical," "horizontal," "top," "bottom," "inner," "outer," etc. are based on orientation or positional relationship shown in the drawings. They are used merely for the convenience of the description and simplifying the description of the present disclosure, but not to indicate or imply that the indicated apparatus or elements must have a specific orientation, or be constructed or operated in a specific orientation, therefore cannot be construed as limitations of the present disclosure.

In the embodiments of the present disclosure, the terms "connected," "fixed," and the like should be broadly understood unless expressly stated and limited otherwise. For example, they can be construed as fixedly connected or detachably connected or integrally connected. They can be mechanically connected or electrically connected and can be directly connected or indirectly connected through an intermediate medium. There can also be an internal connection between two elements. A person of ordinary skill in the art would understand the specific meaning of the terms in the disclosure in specific situations.

Furthermore, the expression "at least one of A, B, and C" has the same meaning as "at least one of A, B, or C" and both include the following combinations of A, B, and C: only A, only B, only C, a combination of A and B, a combination of A and C, a combination of B and C, and a combination of A, B, and C.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

"Approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "approximately" can mean within one or more standard deviations, or within 30%, 20%, 10% or 5% of the stated value.

Exemplary embodiments are described herein with reference to sectional views and/or plan views that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As shown in FIGS. 1A to 6, some embodiments of the present disclosure provide a mold frame 22. The mold frame 22 may be applied to a display apparatus 100 to support a display panel 1 in the display apparatus 100.

The display apparatus 100 may be any product or part having a display function, such as a mobile phone, a tablet computer, a personal digital assistant (PDA), a television, or an in-vehicle computer. The display apparatus 100 may also be a wearable electronic device such as a smart watch, or a smart bracelet.

In some embodiments, as shown in FIGS. 1A to 3, the mold frame 22 includes a bottom frame 221, a side frame 222, and at least one position-limiting structure 223.

Figure 6:
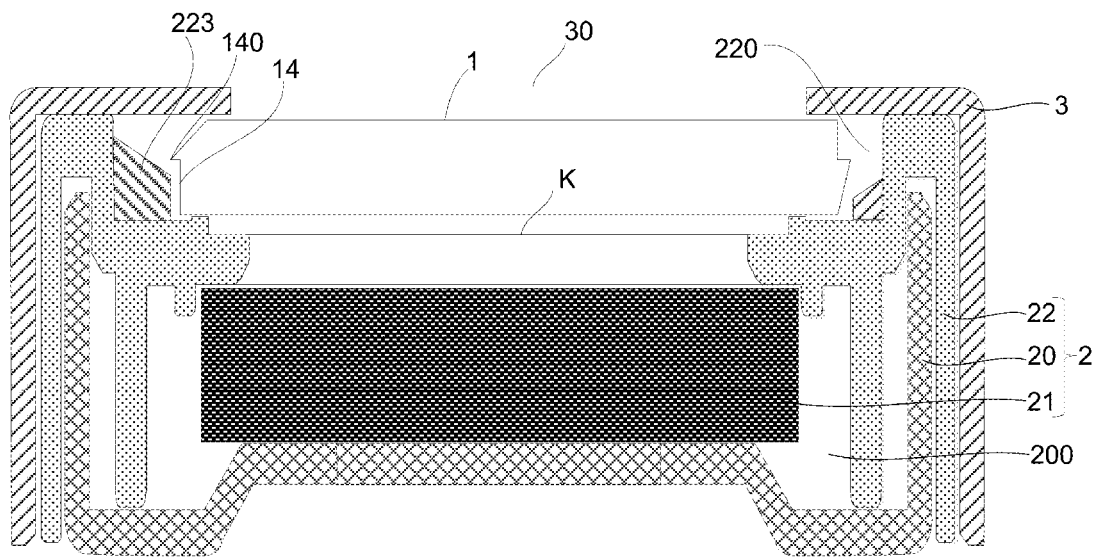
FIG. 6 is a sectional view of a display apparatus, in accordance with some embodiments of the present disclosure.

In some examples, the bottom frame 221 has an opening K. The opening K may be located in the middle region of the bottom frame 221. As shown in FIG. 6, after the mold frame 22 is assembled with a backlight assembly 21, the opening K may allow light emitted from the backlight assembly 21 to pass through, so that the light may travel to the display panel 1.

The bottom frame 221 may have the same shape as the display panel 1, such as a triangular shape, a rectangular shape, or a circular shape.

Figure 4A:
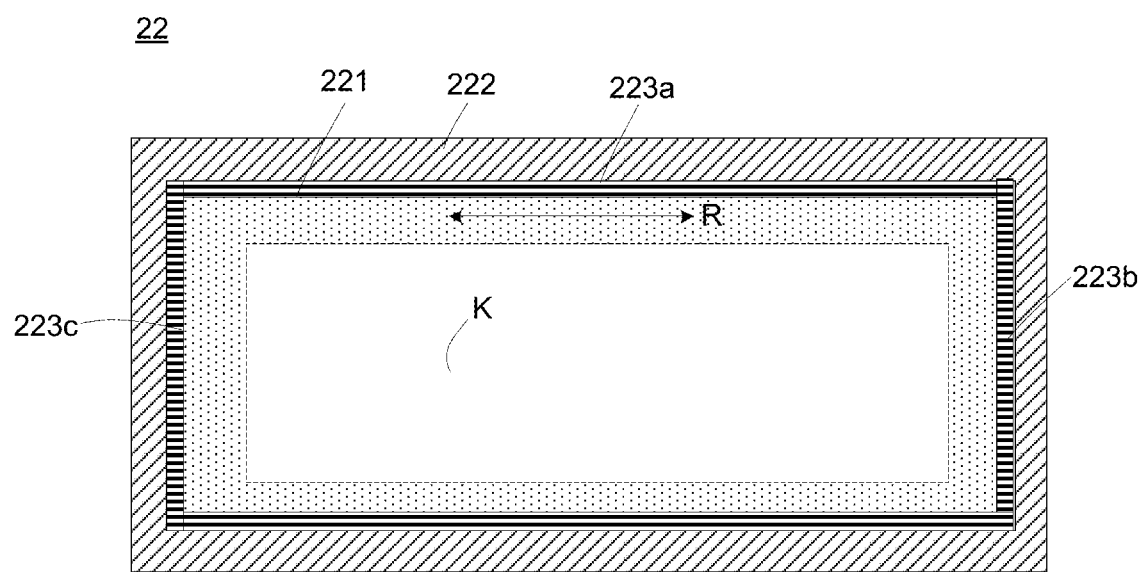
FIG. 4A is a plan view of yet another mold frame, in accordance with some embodiments of the present disclosure.

The side frame 222 may be disposed on a periphery of the bottom frame 221. That is, the side frame 222 is in direct contact with the bottom frame 221. In some examples, the bottom frame 221 is in a shape of a rectangle (as shown in FIG. 4A) or a circle, and the side frame 222 is arranged along the circumference of the bottom frame 221. For example, as shown in FIG. 6, the side frame 222 may be fixed to the edges of the bottom frame 221, so as to form an accommodating space 220 for receiving the display panel 1. In some other examples, the bottom frame 221 is in a shape of the rectangle, and the side frame 222 is disposed on one, two, or three sides of the bottom frame 221.

As shown in FIGS. 1A to 3, the side frame 222 has a first inner side wall 222A closer to the bottom frame 221 and an outer side wall 222B opposite to the first inner side wall 222A.

Figure 1B:
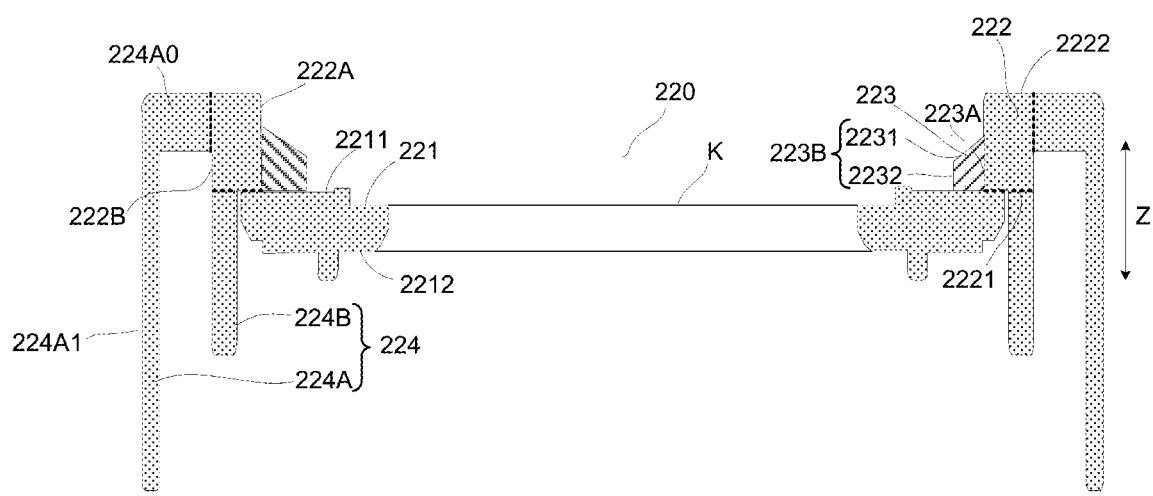
FIG. 1B is a sectional view of another mold frame, in accordance with some embodiments of the present disclosure.
Figure 1C:
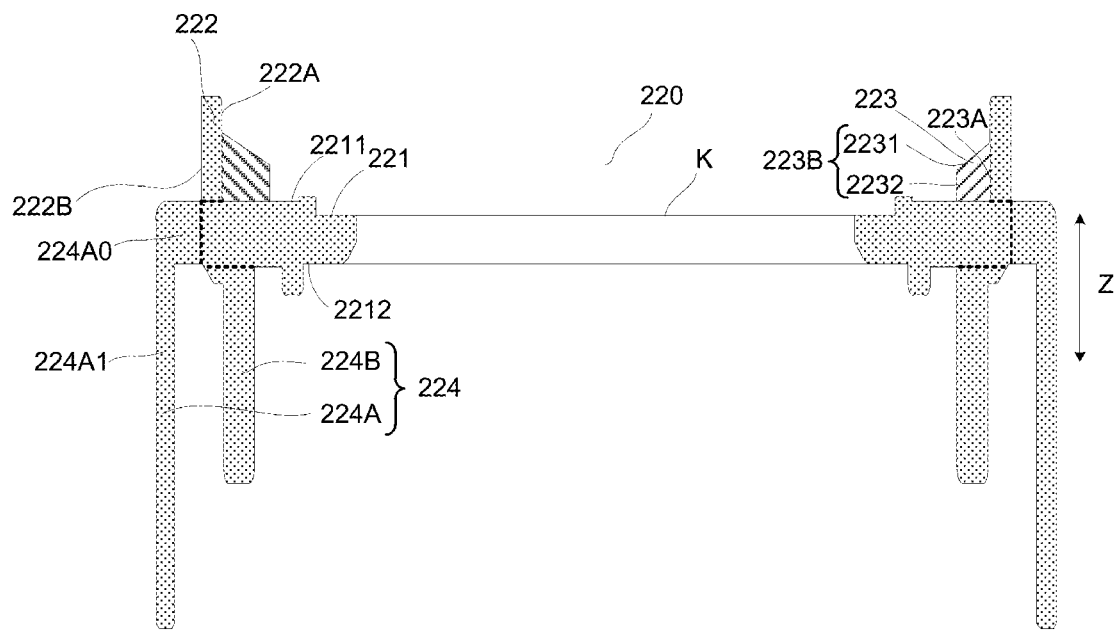
FIG. 1C is a sectional view of yet another mold frame, in accordance with some embodiments of the present disclosure.
Figure 4B:
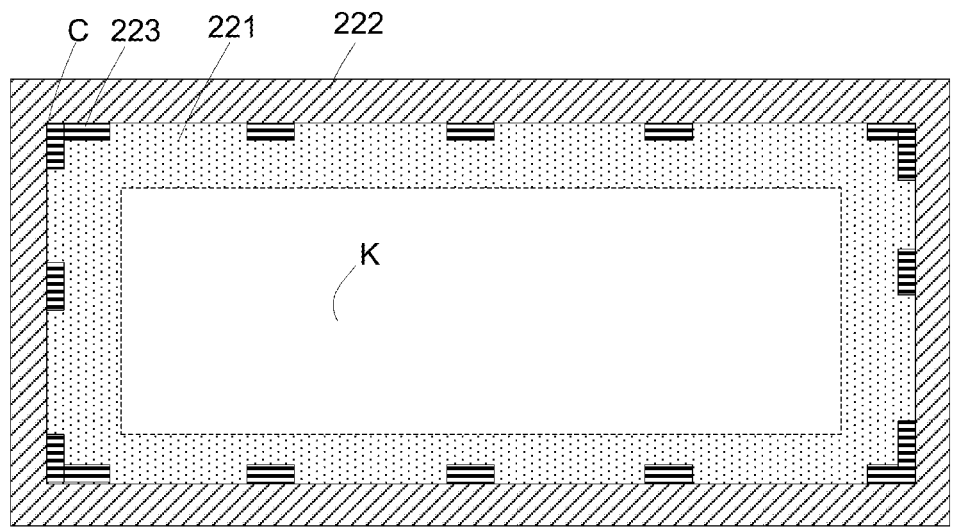
FIG. 4B is a plan view of yet another mold frame, in accordance with some embodiments of the present disclosure.

The at least one position-limiting structure 223 may be disposed on the first inner side wall 222A of the side frame 222. For example, one position-limiting structure 223 is disposed on the first inner side wall 222A of the side frame 222. For another example, as shown in FIGS. 1A to 1C, two position-limiting structures 223 are disposed on two inner side walls opposite to each other of the side frame 222. In another example, as shown in FIGS. 4A and 4B, each inner side wall of the bottom frame 221 may be provided with one or more position-limiting structures 223. Of course, there may be other arrangements of the position-limiting structures 223, which are set according to actual needs.

Figure 18:
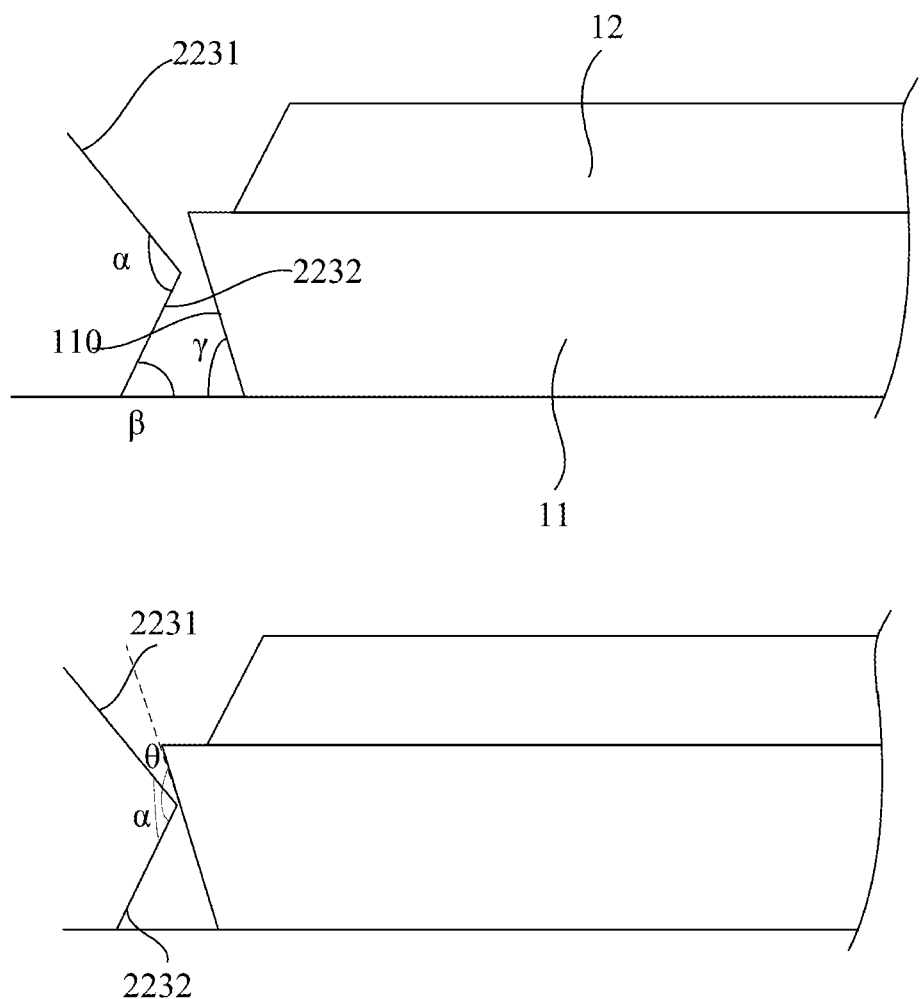
Figure 19:
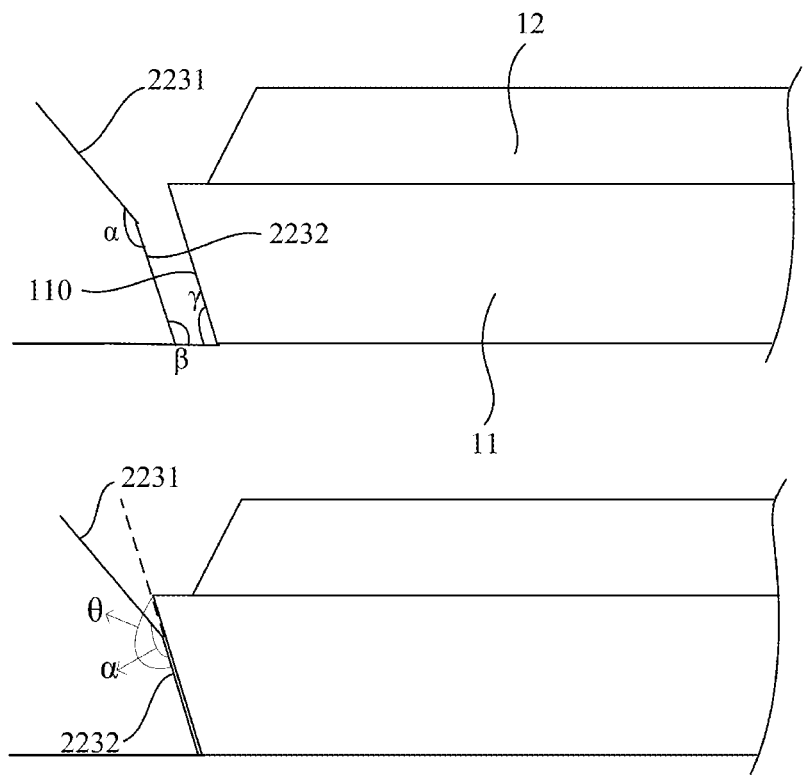

As shown in FIGS. 1A to 3, the position-limiting structure 223 has a first side wall 223A and a second side wall 223B opposite to each other. The first side wall 223A is in direct contact with the first inner side wall 222A of the side frame 222. The second side wall 223B includes two surfaces (indicated as a first surface 2231 and a second surface 2232) that are arranged along a thickness direction Z of the bottom frame 221. The two surfaces are connected. In addition, at least one of the two surfaces is inclined with respect to the first side wall 223A. The thickness direction Z of the bottom frame 221 is a vertical direction in FIGS. 1A and 18.

As shown in FIGS. 1A to 2A, a first angle α, facing the first side wall 223A, between two planes (indicated as a first plane P1 and a third plane P3) where the two surfaces are located is an obtuse angle.

For example, the first angle α may range from approximately 150 degrees to approximately 160 degrees, such as 150 degrees, 152 degrees, 155 degrees, 158 degrees, or 160 degrees.

Figure 2A:
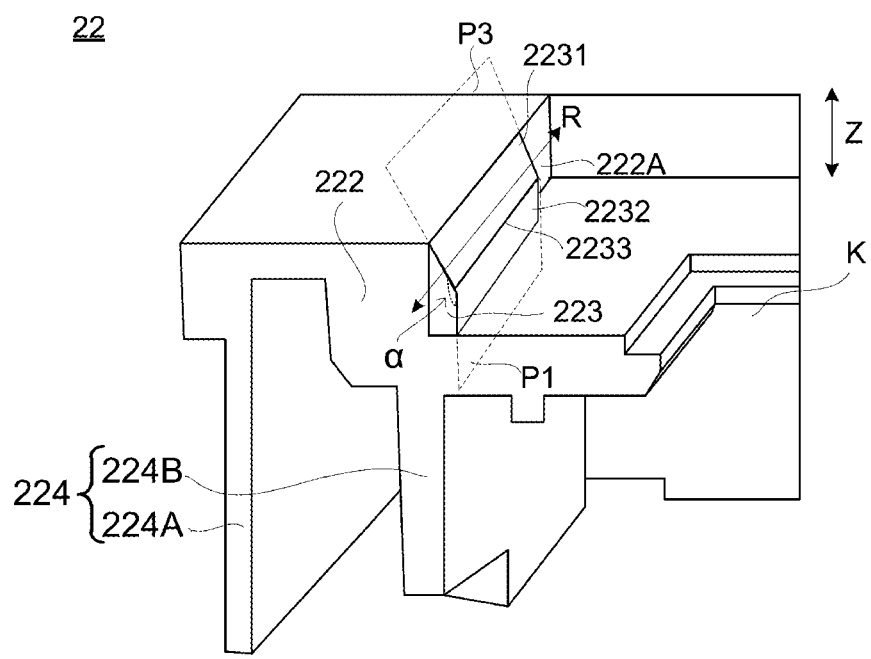
FIG. 2A is a perspective view of a portion of yet another mold frame, in accordance with some embodiments of the present disclosure.

On this basis, as shown in FIG. 2A, there is a corner 2233 where the first surface 2231 and the second surface 2232 of the second side wall 223B join. Referring to FIGS. 6, and 9 to 19, after the display panel 1 is moved and approaches the first inner side wall 222A of the side frame 222, a side face 14 of the display panel 1 proximate to the side frame 222 may abut against the corner 2233 or the second surface 2232. Since the first angle α is an obtuse angle, even though the side face 14 of the display panel 1 abuts against the corner 2233, the stress applied to the side face 14 of the display panel 1 by the corner 2233 is much smaller than the stress that is applied to the first inner side wall 222A of the side frame 222 by the sharp corner 140 of the display panel 1 in the related art, so that the contact between the corner 2233 and the side face 14 of the display panel 1 may not produce debris.

In this way, in some application scenarios, for example, during a transportation process of the products, after the display panel 1 moves to a position approaching the first inner side wall 222A of the side frame 222, the position-limiting structure 223 may prevent debris from being produced, which may further improve the display effect of the display apparatus 100.

In the embodiments of the present disclosure, the number of the position-limiting structures 223 disposed on an inner side wall of the side frame 222 may be one or more, which may be set according to actual needs.

In some embodiments, as shown in FIG. 4A, the at least one position-limiting structure 223 includes one position-limiting structure 223a extending along a length direction R of the first inner side wall 222A of the side frame 222 to two ends of the first inner side wall 222A, and the position-limiting structure 223a is connected to position-limiting structures 223b and 223c that are respectively disposed on second and third inner side walls adjacent to the first inner side wall 222A of the side frame 222.

As shown in FIGS. 1A to 4A, it will be noted that the length direction R of the first inner side wall 222A refers to an extending direction of the first inner side wall 222A perpendicular to a thickness direction Z of the bottom frame 221.

Figure 3:
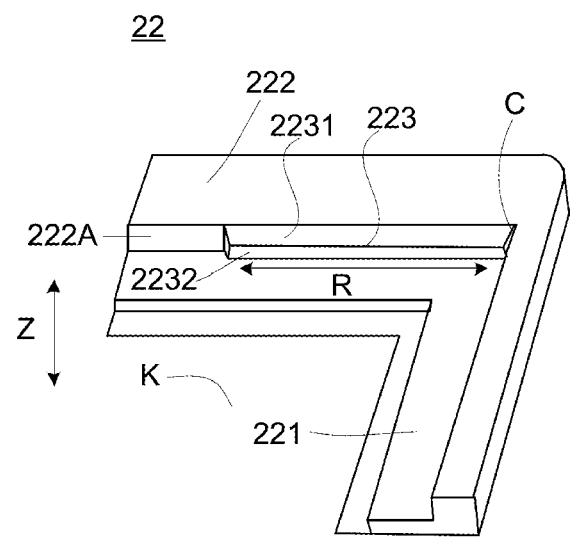
FIG. 3 is a perspective view of a portion of yet another mold frame, in accordance with some embodiments of the present disclosure.

In some embodiments, as shown in FIGS. 3 and 4B, the at least one position-limiting structure 223 includes a plurality of position-limiting structures 223 which are spaced apart, such as two, three, four, or more position-limiting structures 223.

On this basis, as shown in FIG. 4B, at least one of the plurality of position-limiting structures 223 is disposed at a corner C of the side frame 222. For example, one of the plurality of position-limiting structures 223 is disposed at one of the two corners C located at the two ends of the first inner side wall 222A of the side frame 222. In another example, as shown in FIG. 4B, two of the plurality of position-limiting structures 223 are disposed at the two corners C, respectively.

In this way, an assembly tolerance between the position-limiting structure 223 and the display panel 1 may be reduced in the process of assembling the mold frame 22 and the display panel 1, thereby ensuring that the assembly process may be performed successfully.

Figure 2B:
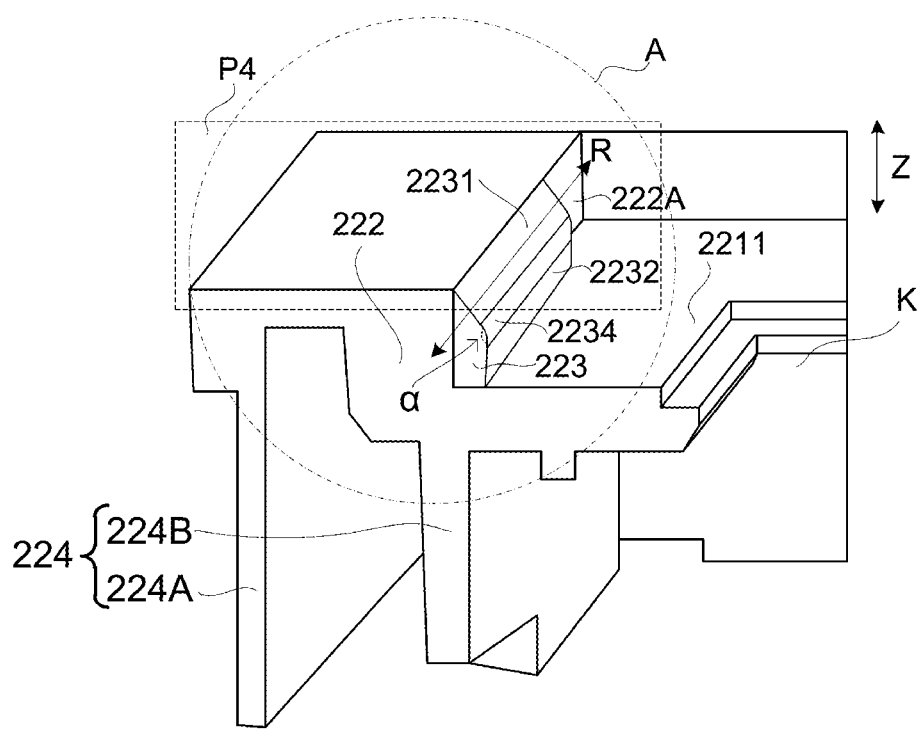
FIG. 2B is a perspective view of a portion of yet another mold frame, in accordance with some embodiments of the present disclosure.

In some embodiments, as shown in FIG. 2B, the two surfaces (i.e., the first surface 2231 and the second surface 2232) are connected through a curved surface 2234. In some examples, an orthographic projection of the curved surface 2234 on a fourth plane P4 perpendicular to both the first side wall 223A and a first surface 2211 of the bottom frame 221 directly connected to the first side wall 223A is a curved line segment, and the curved line segment may have a radius of curvature that ranges from approximately 0.5 mm to approximately 2 mm. For example, the radius of curvature of the curved line segment is 0.5 mm, 0.8 mm, 1 mm, 1.5 mm, or 2 mm.

In this case, the curved surface 2234 has the same effect as the corner 2233. In addition, the curved surface 2234 may further reduce the stress applied to the side face 14 of the display panel 1, which may prevent burrs from appearing on the surface of the position-limiting structure 223.

In some embodiments, one of the two surfaces is inclined with respect to the first side wall 223A, and the other surface of the two surfaces is parallel to the first side wall 223A. For example, as shown in FIGS. 1A to 3, 9 and 15, the surface connected to the first surface 2211 of the bottom frame 221 (i.e., the second surface 2232) may be parallel to the first side wall 223A, and the other surface (i.e., the first surface 2231) may be inclined with respect to the first side wall 223A.

In this case, the side face 14 of the display panel 1 proximate to the side frame 222 may abut against the second surface 2232, so that there is a gap between the sharp corner 140 of the display panel 1 and the first surface 2231 of the second side wall 223B.

In some other embodiments, referring to FIGS. 10 to 14, and 16 to 19, the two surfaces are both inclined with respect to the first side wall 223A.

In this case, the side face 14 of the display panel 1 proximate to the side frame 222 may abut against the corner 2233, so that there is a gap between the sharp corner 140 of the display panel 1 and the first surface 2231 of the second side wall 223B.

In some embodiments, the position-limiting structure 223, the bottom frame 221 and the side frame 222 are integrally formed. In this way, the position-limiting structure 223, the bottom frame 221, and the side frame 222 may be formed through a molding injection process.

Figure 5:
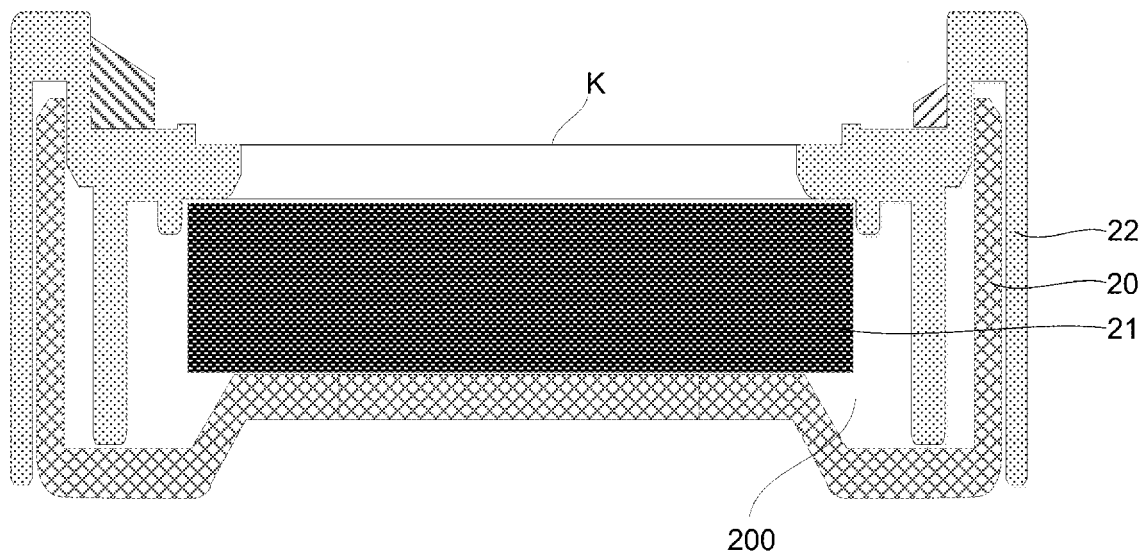
FIG. 5 is a sectional view of a backlight module, in accordance with some embodiments of the present disclosure.

In some embodiments, as shown in FIGS. 1A to 2B, 5 and 6, the mold frame 22 further includes fixing members 224 each of which is connected to the side frame 222 and/or the bottom frame 221. The fixing members 224 may be configured to fix the mold frame 22. For example, as shown in FIGS. 5 and 6, the fixing members 224 may fix the mold frame 22 to a back plate 20, so as to enclose an accommodating space 200 for receiving the backlight assembly 21.

In some examples, the mold frame 22 includes two, three or four fixing members 224. For example, the mold frame 22 includes two fixing members 224, and the two fixing members 224 are disposed opposite to each other (shown in FIGS. 1A to 1C) or disposed adjacent to each other. In another example, the mold frame 22 includes three or four fixing members 224 arranged along the circumferential direction of the bottom frame 221.

In some examples, as shown in FIG. 1A, the fixing member 224 is connected to the side frame 222 and the bottom frame 221. In some other examples, the fixing member 224 is connected to the side frame 222 (as shown in FIG. 1B) or the bottom frame 221 (as shown in FIG. 1C).

In some examples, as shown in FIGS. 1A to 2B, 5 and 6, the fixing member 224 includes a first support plate 224A and a second support plate 224B. The first support plate 222A includes a horizontal portion 224A0 and a vertical portion 224A1. The horizontal portion 224A0 is parallel to the first surface 2211 of the bottom frame 221. As shown in FIGS. 1A to 1C, one end of the horizontal portion 224A0 is connected to a corresponding outer side wall of the side frame 222 or a corresponding edge of the bottom frame 221, and an opposite end of the horizontal portion 224A0 is connected to the vertical portion 224A1. The vertical portion 224A1 extends along the thickness direction Z of the bottom frame 221. The second support plate 224B also extends along the thickness direction Z of the bottom frame 221. As shown in FIGS. 1A to 1C, the second support plate 224B is connected to a second surface 2212 of the bottom frame 221 opposite to the first surface 2211 of the bottom frame 221 or a third surface 2221 of the side frame 222 directly connected to the bottom frame 221.

In this way, the fixing member 224, the side frame 222 and the bottom frame 221 constitute a U-shaped structure, so that a side wall portion of the back plate 20 can insert into the gap between the first support plate 222A and the second support plate 222B to match with the mold frame 22. That is to say, the first support plate 224A and the second support plate 224B may form a locking groove used to lock the back plate 20.

In some examples, as shown in FIGS. 1A and 1B, a surface of the horizontal portion 224A0 of the first support plate 224A facing away from the bottom frame 221 and a fourth surface 2222 of the side frame 222 opposite to third surface 2221 of the side frame 222 are in a same plane.

Of course, there are various connection manners to connect the mold frame 22 to the back plate 20, and the connection manner described as above is merely an example, which shall not be construed as a limitation to the present disclosure.

In some embodiments, the bottom frame 221, the side frame 222, the position-limiting structure 223 and the fixing members 224 are integrally formed.

In some examples, the bottom frame 221, the side frame 222, the position-limiting structure 223, and the fixing members 224 are made of a same material, which may be a thermoplastic material, such as thermoplastic rubber, or thermoplastic plastic. For example, the thermoplastic rubber includes thermoplastic polyurethanes (TPU), thermoplastic polyester elastomer (TPEE), styrene butadiene styrene block polymer (SBS), etc. The thermoplastic plastic includes acrylonitrile butadiene styrene plastic (ABS), polypropylene (PP), polyamide (PA), polyformaldehyde (POM), polycarbonate (PC), etc.

Figure 7:
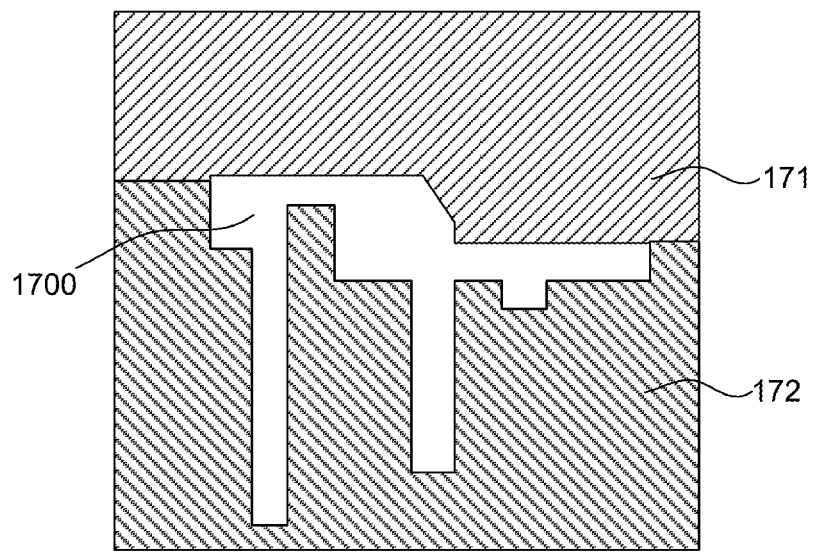
FIG. 7 is a schematic diagram of a mold used for manufacturing a mold frame, in accordance with some embodiments of the present disclosure.

On this basis, the mold frame 22 may be manufactured through an injection molding process. For example, the mold used in the process of manufacturing the mold frame 22 may be the mold 170 shown in FIG. 7. As shown in FIG. 7, the mold 170 includes an upper mold 171 and a lower mold 172, and the portion of the lower mold 172 hollowed out has a structure matched with the mold frame 22, for accommodating heated thermoplastic material in the process of manufacturing the mold frame 22. After the mold 170 is cooled, by moving the upper mold 171 upward and the lower mold 172 downward, the mold 170 is opened, and the mold frame 22 is obtained.

Figure 8:
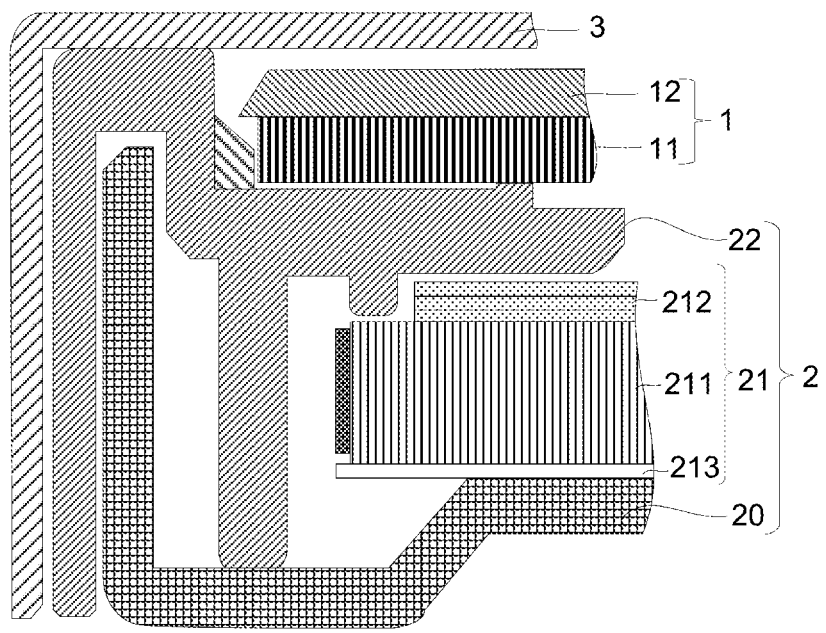
FIG. 8 is a sectional view of a portion of another display apparatus, in accordance with some embodiments of the present disclosure.

Some embodiments of the present disclosure provide a backlight module 2. As shown in FIGS. 5 and 8, the backlight module 2 includes the mold frame 22, the back plate 20 matched with the mold frame 22, and the backlight assembly 21. The back plate 20 is disposed on a side of the bottom frame 221 away from the side frame 222. The backlight assembly 21 is disposed within the accommodating space 200 enclosed by the back plate 20 and the mold frame 22. In this case, the backlight assembly 21 faces the opening K of the bottom frame 221, so that the light emitted from the backlight assembly 21 can pass through the opening K.

In some embodiments, as shown in FIG. 8, the backlight assembly 21 may include a light source, a light guide plate 211, and optical films 212 disposed on a light exit side of the light guide plate 211.

In addition, as shown in FIG. 8, the backlight assembly 21 may further include a reflective sheet 213, and the reflective sheet 213 may be disposed on a side of the light guide plate 211 away from the optical films 212. The structure of the backlight module 4 shown in FIG. 8 is only for illustration and is not a limitation on the present disclosure.

In some examples, the optical films 212 may include a diffusion film which may increase the uniformity of light to be incident onto the display panel 1. The optical films 212 may further include a brightness enhancement film (BEF) and/or a dual brightness enhancement film (DBEF), or may also include a composite brightness enhancement film that combines the functions of the BEF and the DBEF. The BEF may be, for example, a prism sheet.

The light guide plate 211 may be a wedge type light guide plate or a flat type light guide plate. FIG. 8 shows an example in which the light guide plate 212 is the flat type light guide plate.

In some examples, as shown in FIG. 8, the backlight module 2 is an edge-lit backlight module. In this case, the light source may be a light source composed of light-emitting diodes (LEDs). As shown in FIG. 8, the light source may be arranged along at least one edge of the light guide plate 211.

In some other examples, the backlight module 2 is a direct-lit backlight module. In this case, the light guide plate 211 is replaced with a diffusion plate. The light source may be a light board with a plurality of LEDs arranged in an array, and the light board may be disposed between the diffusion plate and the reflective sheet 213.

The beneficial effects of the backlight module 2 are the same as the beneficial effects of the mold frame 22 provided by some embodiments of the present disclosure, and thus will be not repeated here.

Some embodiments of the present disclosure provide a display apparatus 100. As shown in FIG. 6, the display apparatus 100 may include the display panel 1 and the backlight module 2 configured to provide backlight for the display panel 1. The display panel 1 is disposed within the accommodating space 220 enclosed by the bottom frame 221 and the side frame 223. The position-limiting structure 223 is configured to limit the position of the display panel 1, so that there is a gap between the first inner side wall 222A of the side frame 222 and a corresponding sharp corner 140 of the display panel 1.

The beneficial effects of the display panel 1 are the same as the beneficial effects of the mold frame 22 provided by some embodiments of the present disclosure, and thus will be not repeated here.

In some examples, the display panel 1 may include a first substrate and a second substrate opposite to each other. For example, in the case where the display panel 1 is a liquid crystal display panel, as shown in FIG. 8, the first substrate may be an array substrate 11 and the second substrate may be an opposite substrate 12. The array substrate 11 and the opposite substrate 12 are sequentially arranged in a direction away from the bottom frame 221.

It will be noted that, the sharp corner 140 may be produced in the process of manufacturing the display panel 1. In the process of manufacturing the display panel 1, a motherboard containing a plurality of the first substrates and another motherboard containing a plurality of the first substrates need to be aligned and bonded, so as to form a new motherboard containing a plurality of display panels. The new motherboard is then cut into a plurality of independent display panels. After that, a grinding process is performed on the display panel to obtain a display panel with smooth edges. Since the limitation of machining accuracy, the edge of one of the two substrates may exceed the other substrate, and thus the sharp corner 140 is produced.

For example, in a case where the display panel 1 is a liquid crystal display panel, as shown in FIGS. 15 to 19, an edge of the array substrate 11 may exceed a corresponding edge of the opposite substrate 12; or, as shown in FIGS. 9 to 14, an edge of the opposite substrate 12 may exceed a corresponding edge of the array substrate 11. That is to say, the sharp corner 140 includes the sharp corner of the array substrate 11 exceeding the opposite substrate 12, or the sharp corner of the opposite substrate 12 exceeding the array substrate 11.

In some embodiments, as shown in FIGS. 9 to 19, in the thickness direction Z of the bottom frame 221, a first distance H between a line at which the two planes (i.e., the first plane P1 and the third plane P3) intersect and the first surface 2211 of the bottom frame 221 is less than a second distance D between a surface of the array substrate 11 facing away from the bottom frame 221 and the first surface 2211 of the bottom frame 221. For example, the second distance D is approximately 0.9 mm, and the first distance H is approximately 0.8 mm. In another example, the second distance D is approximately 0.8 mm, and the first distance H is approximately 0.6 mm. Of course, the first distance H and the second distance D may have other values, which may be set according to actual needs.

Figure 2C:
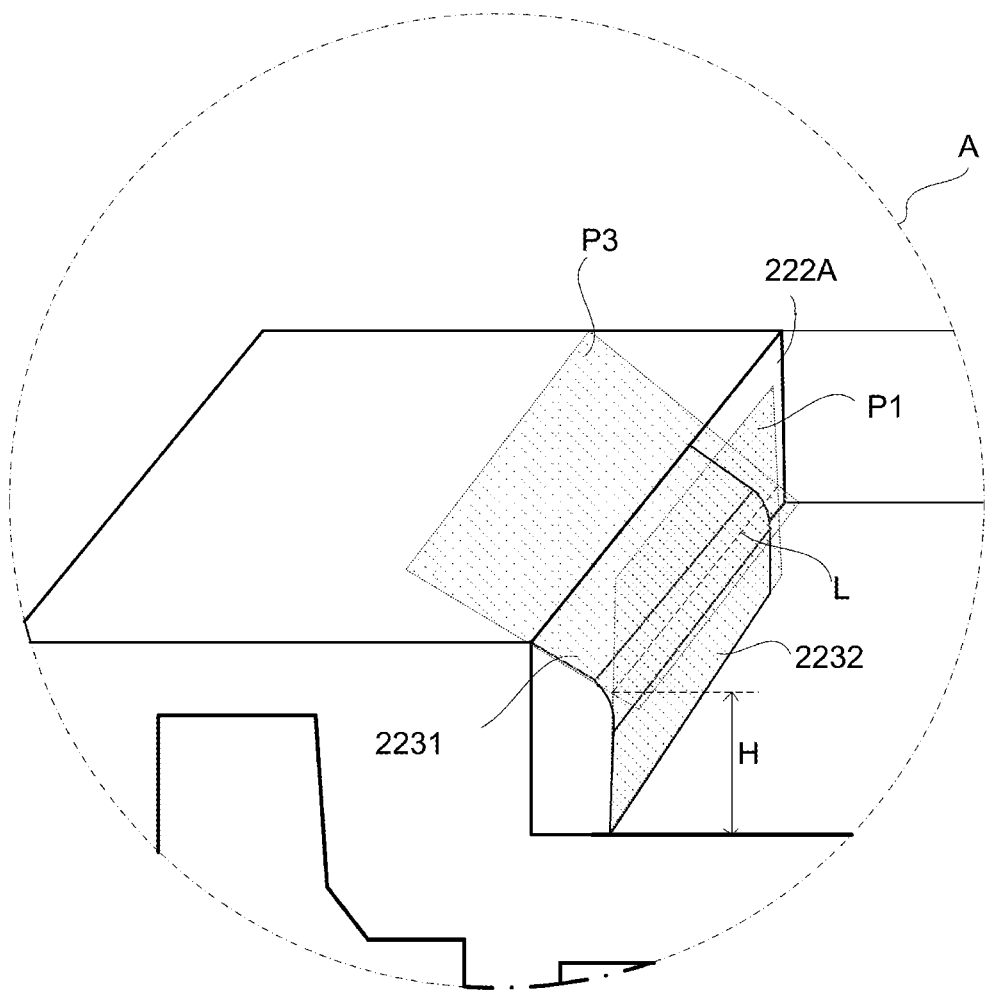
FIG. 2C is an enlarged view of region A in FIG. 2B.

It will be noted that, in a case where the two surfaces directly connect, as shown in FIG. 2A, the line where the corner 2233 is located is the line at which the two planes intersect. In a case where the two surfaces are connected through the curved surface 2234, as shown in FIGS. 2B and 2C, the line L shown in FIG. 2C is the line at which the two planes intersect.

In some examples, the first distance H is n times the second distance D, and n ranges from approximately 0.5 to approximately 0.8. For example, n is 0.5, 0.6, 0.7, 0.8, etc.

In some embodiments, as shown in FIGS. 9 to 19, an angle, facing the array substrate 11, between the first plane P1 where the second surface 2232 is located and the first surface 2211 of the bottom frame 221 is called a second angle β. An angle, facing the position-limiting structure 223, between the first surface 2211 of the bottom frame 221 and the side face 110 of the array substrate 11 is called a third angle γ. As shown in FIGS. 9 to 19, the second angle β and the third angle γ may be acute angles, obtuse angles, or right angles.

In addition, the sum of the second angle β and the third angle γ is less than or equal to 180 degrees. In this way, the bottom edge of the position-limiting structure 223 may not touch the bottom edge of the array substrate 11, which may prevent the position-limiting structure 223 and the array substrate 11 from striking each other.

In some embodiments, as shown in FIGS. 9 to 19, there is a distance between the second surface 2232 of the position-limiting structure 223 and the sharp corner 140 of the display panel 1. In this way, the sharp corner 140 of the display panel 1 will not strike the second surface 2232.

In some examples, as shown in FIGS. 9 to 14, the edge of the opposite substrate 12 may exceed a corresponding edge of the array substrate 11, and the first angle α is less than $$\left[180° - \arctan\left(\frac{\Delta d}{D-H}\right) - (90°-\beta)\right]$$

degrees, where Δd is a horizontal distance between the edge of the opposite substrate 12 and a line segment at which the second side wall 223B comes into contact with the side face 110 of the array substrate 11 after the liquid crystal display panel abuts against the position-limiting structure 223.

Figure 9:
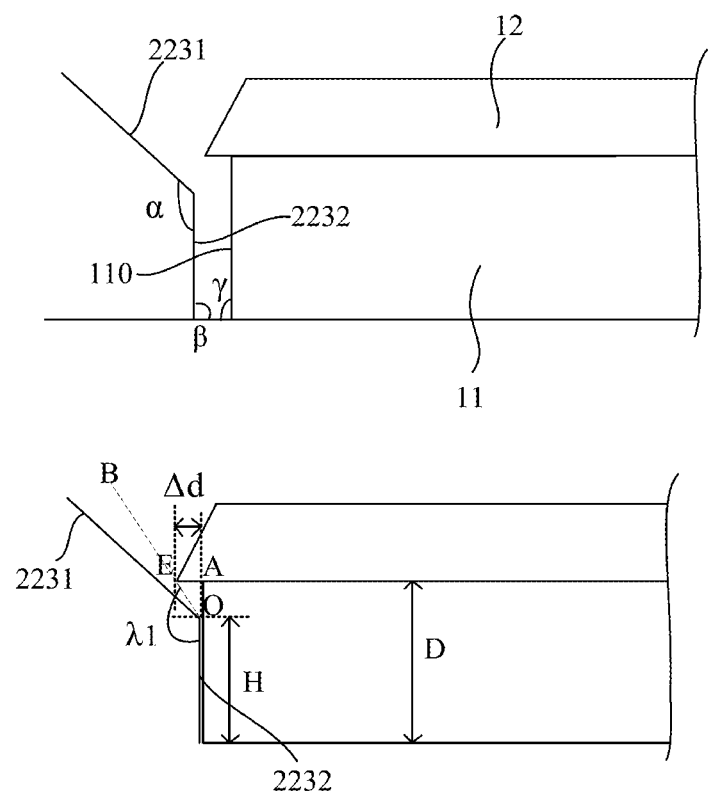
FIGS. 9 to 19 are partial sectional views of display apparatuses, in accordance with some embodiments of the present disclosure.
Figure 14:
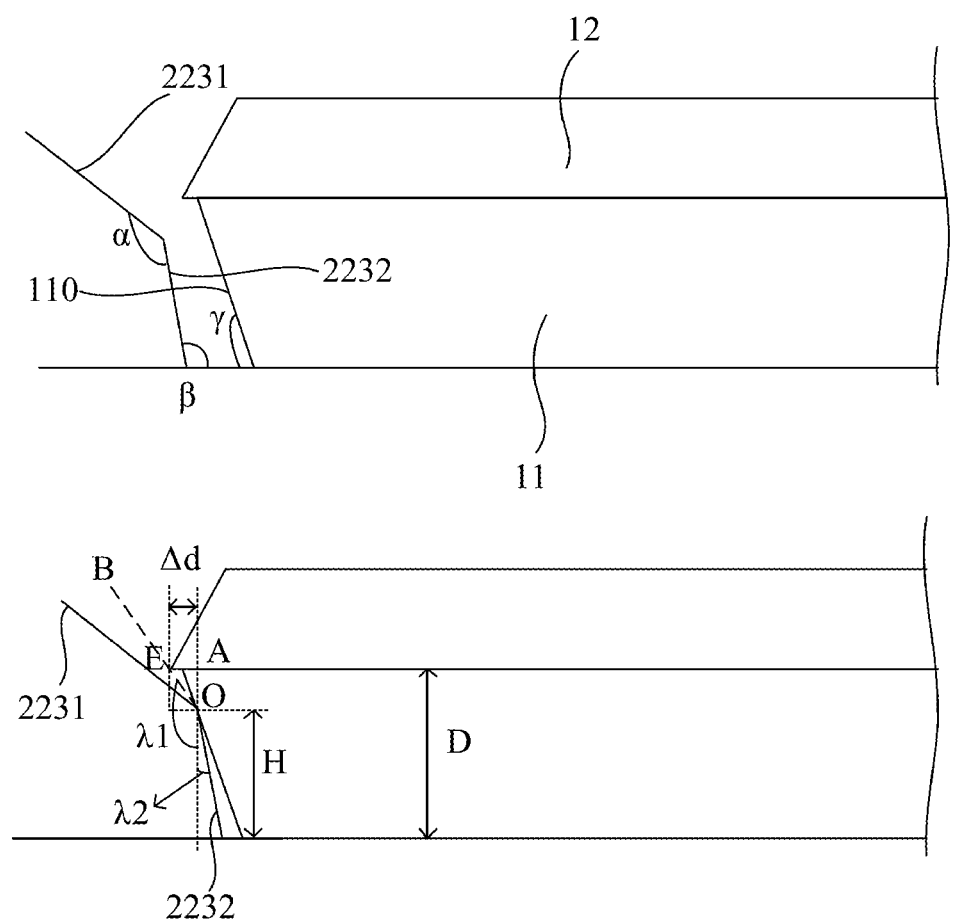
Figure 15:
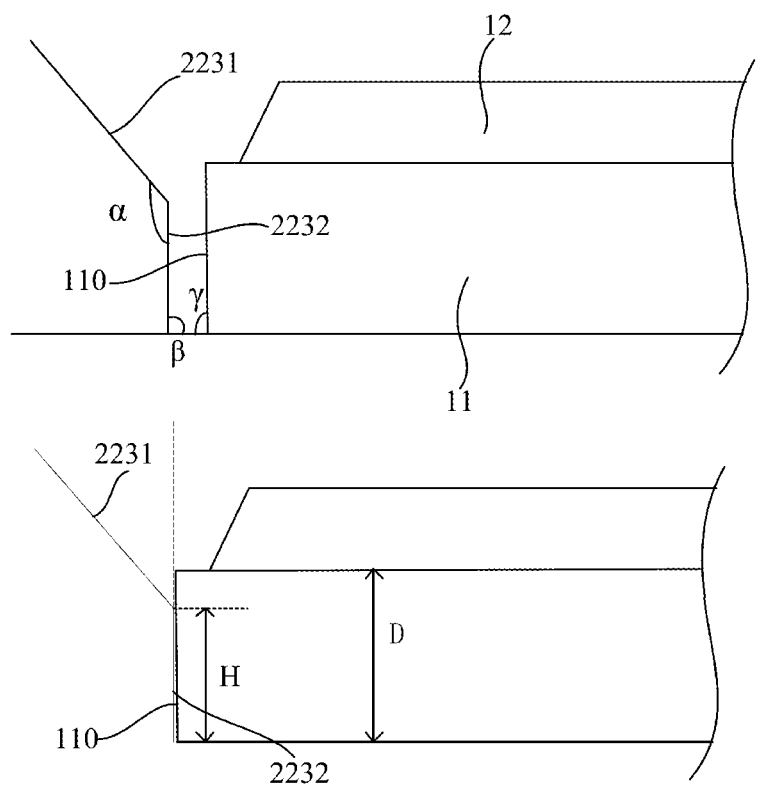

It will be noted that, the second angle β may be a right angle (as shown in FIG. 9), an acute angle (as shown in FIGS. 10 to 13), or an obtuse angle (as shown in FIG. 14).

Figure 10:
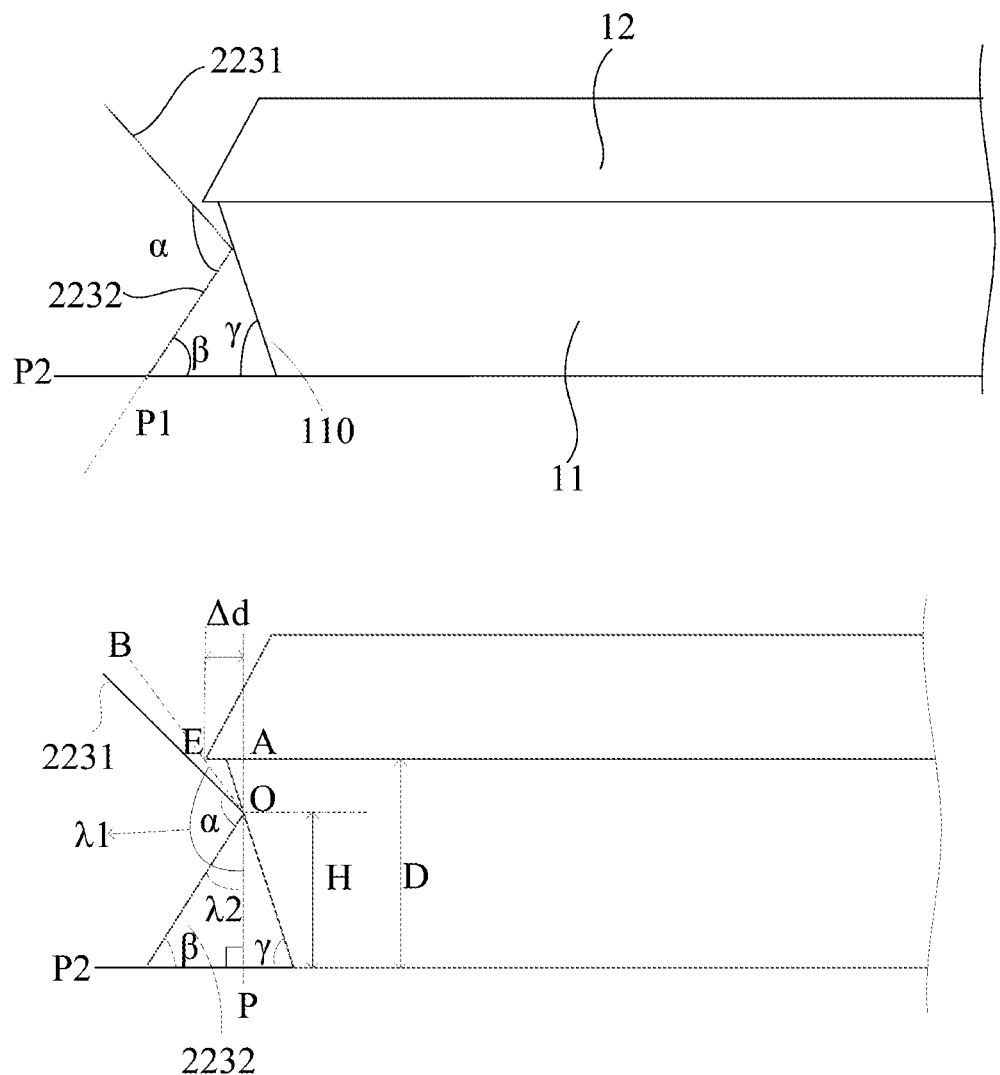
Figure 11:
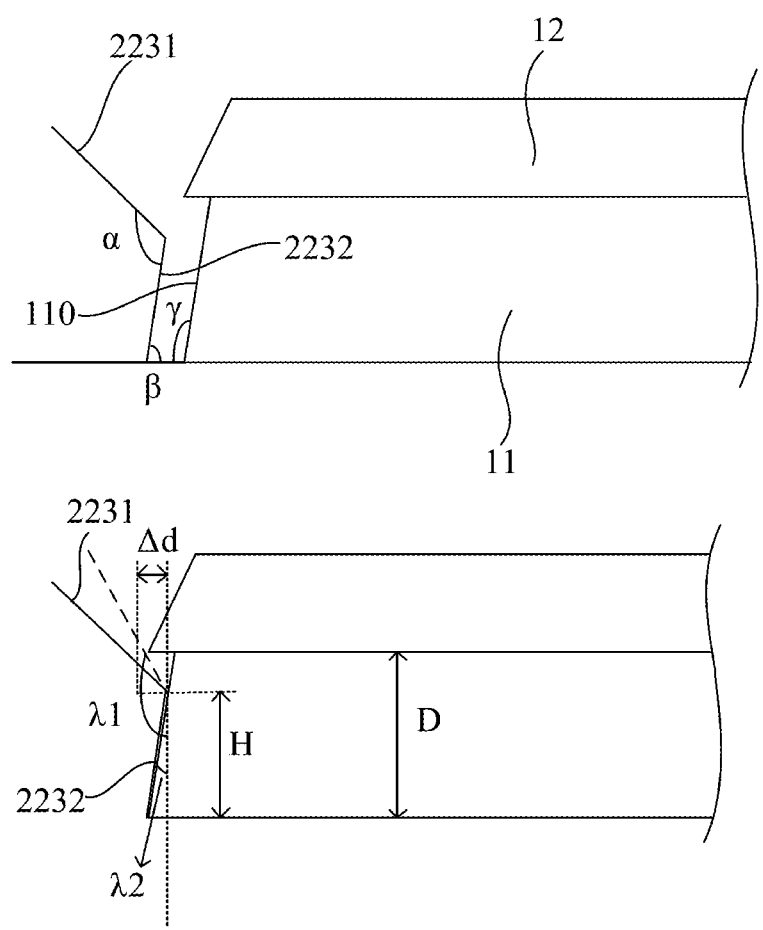
Figure 12:
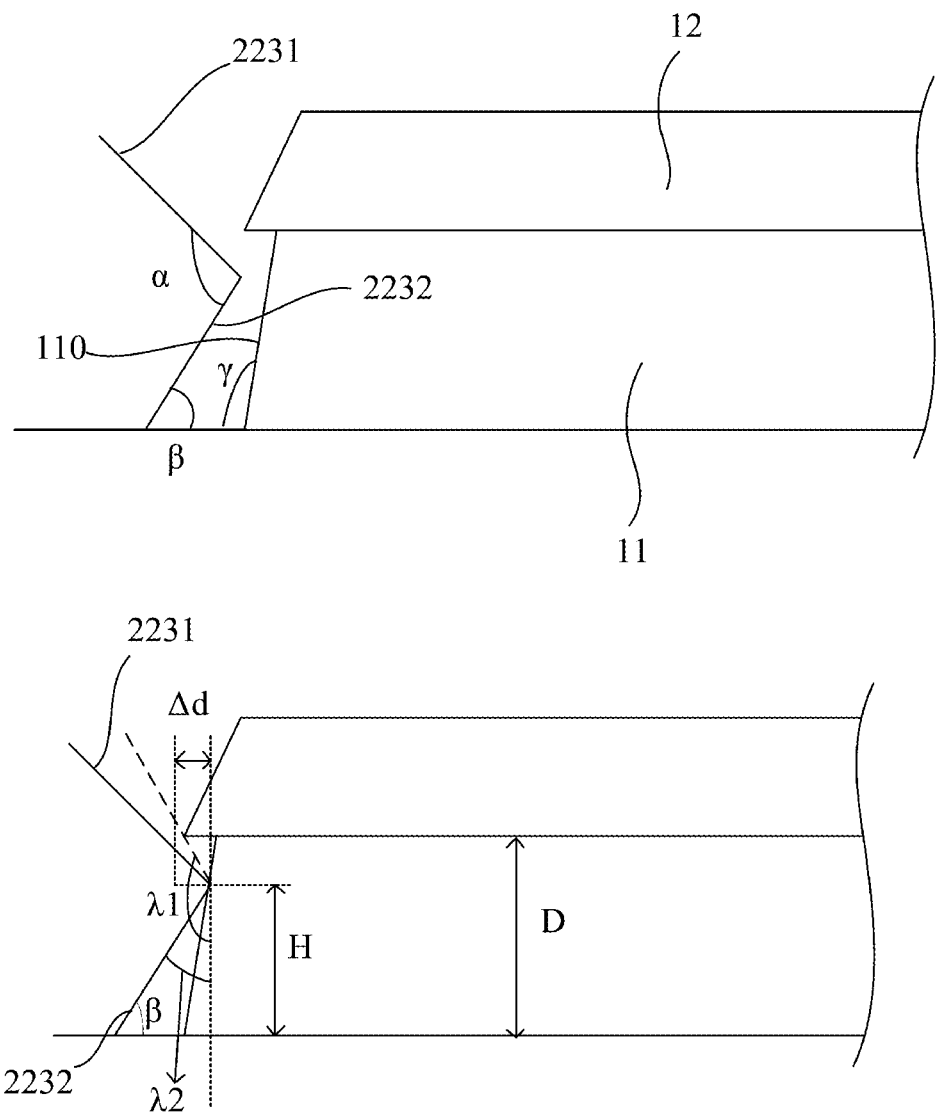
Figure 13:
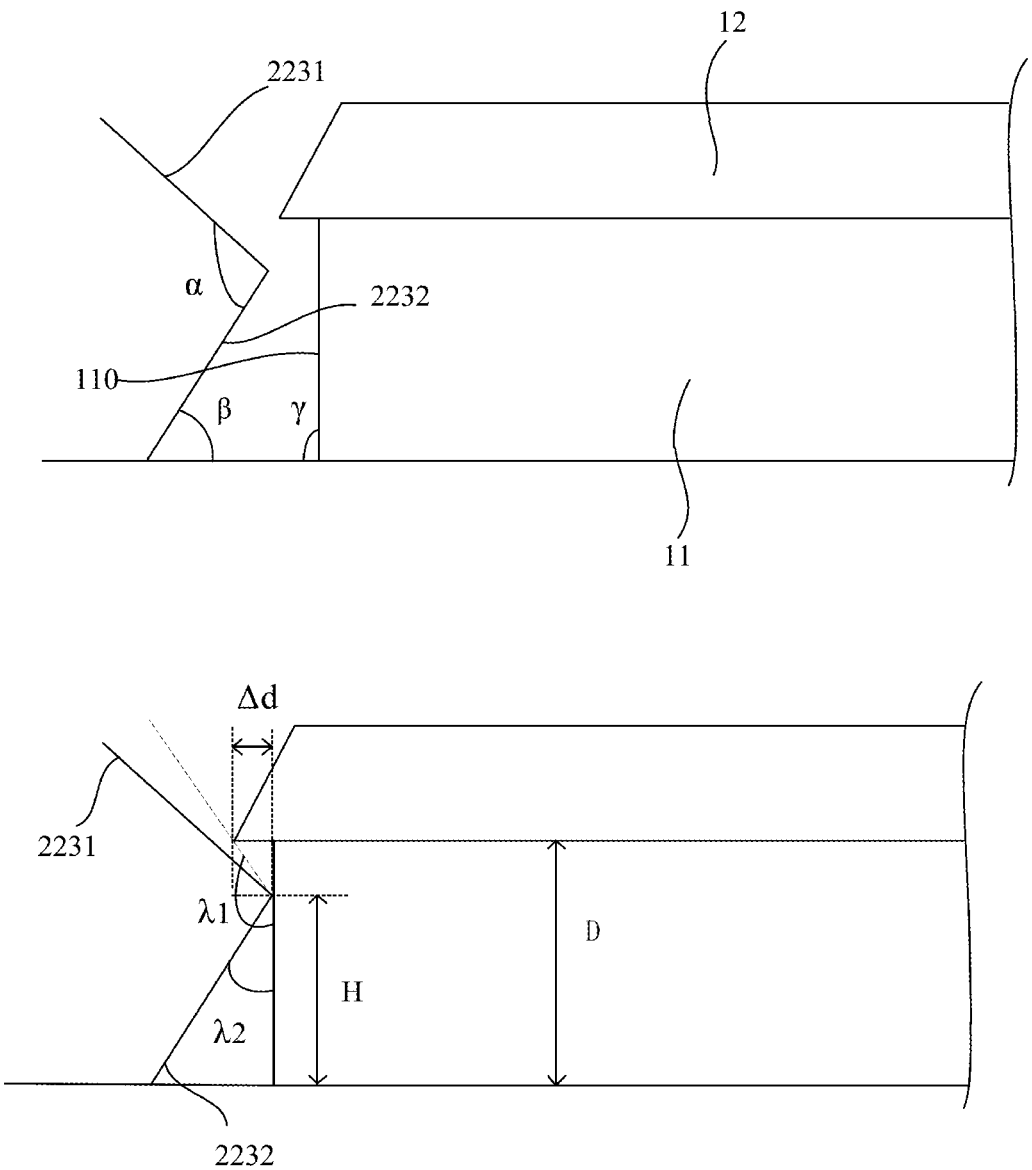

In the case where the second angle β is an acute angle, FIG. 10 will be taken as an example to explain why the first angle α is less than $$\left[180° - \arctan\left(\frac{\Delta d}{D-H}\right) - (90°-\beta)\right]$$

degrees. As shown in FIG. 10, the position indicated by line OB is an extreme position of the first surface 2231 where the first surface 2231 and the sharp corner of the opposite substrate 12 just come into contact. Thereby, in order to make the sharp corner of the opposite substrate 12 keep a certain distance with the first surface 2231, the first angle α shall be less than the difference between an angle λ1 and an angle λ2. The degree of the angle λ1 is equal to the difference between 180 degrees and an angle AOB, and the degree of the angle AOB may be calculated through triangle AOE. As shown in FIG. 10, the tangent value of the angle AOB is equal to $$\frac{\Delta d}{D-H}.$$

That is to say, the angle AOB is equal to $$\arctan\left(\frac{\Delta d}{D-H}\right)$$

degrees, and thus the angle λ1 is equal to $$\left[180° - \arctan\left(\frac{\Delta d}{D-H}\right)\right]$$

degrees, that is, $$\lambda 1 = 180° - \arctan\left(\frac{\Delta d}{D-H}\right).$$

Since line OP is perpendicular to the second plane P2 where the first surface 2211 of the bottom frame 221 is located, the angle λ2 is equal to the difference between 90 degrees and the second angle β, that is, λ2=90°−β. So, the difference between the angle λ1 and the angle λ2 is $$\left[180° - \arctan\left(\frac{\Delta d}{D-H}\right) - (90°-\beta)\right]$$

degrees. Therefore, the first angle α is less than $$\left[180° - \arctan\left(\frac{\Delta d}{D-H}\right) - (90° - \beta)\right]$$

degrees.

In the case where the second angle β is a right angle, as shown in FIG. 9, in order to make the sharp corner of the opposite substrate 12 keep a certain distance with the first surface 2231, the first angle α shall be less than the angle λ1. As described above, the angle λ1 is equal to $$\left[180° - \arctan\left(\frac{\Delta d}{D-H}\right)\right]$$

degrees. Since the second angle β in FIG. 9 is 90 degrees, the conclusion that the first angle α is less than $$\left[180° - \arctan\left(\frac{\Delta d}{D-H}\right) - (90° - \beta)\right]$$

degrees still holds.

In the case where the second angle β is an obtuse angle, as shown in FIG. 14, the position indicated by line OB is an extreme position of the first surface 2231 where the first surface 2231 and the sharp corner of the opposite substrate 12 just come into contact. Therefore, in order to make the sharp corner of the opposite substrate 12 keep a certain distance with the first surface 2231, the first angle α shall be less than the sum of angle λ1 and angle λ2. The calculation of the angle λ1 is the same as the above. That is to say, $$\lambda 1 = 180° - \arctan\left(\frac{\Delta d}{D-H}\right).$$

The angle λ2 is equal to the difference between the second angle β and 90 degrees, that is, λ2=β−90°. So, the first angle α is less than $$\left[180° - \arctan\left(\frac{\Delta d}{D-H}\right) + (\beta - 90°)\right]$$

degrees, and $$\left[180° - \arctan\left(\frac{\Delta d}{D-H}\right) + (\beta - 90°)\right]$$

is equal to $$\left[180° - \arctan\left(\frac{\Delta d}{D-H}\right) - (90° - \beta)\right].$$

Therefore, the conclusion still holds.

In some examples, as shown in FIGS. 15 to 19, the edge of the array substrate 11 exceeds a corresponding edge of the opposite substrate 12, and the first angle α is less than or equal to a sum of the second angle β and the third angle γ.

Figure 16:
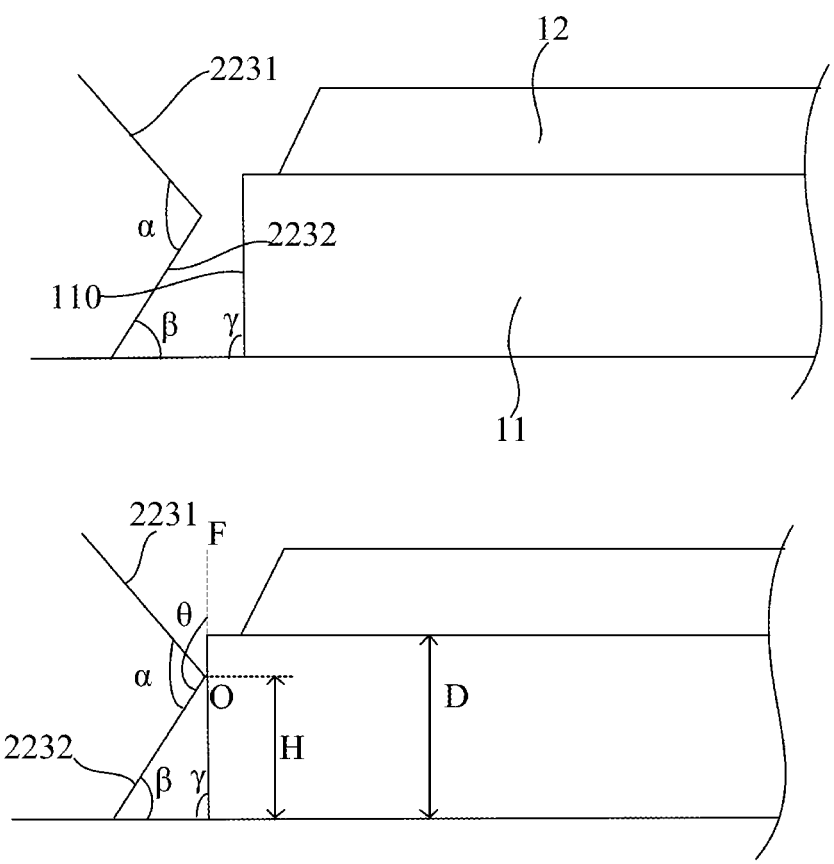
Figure 17:
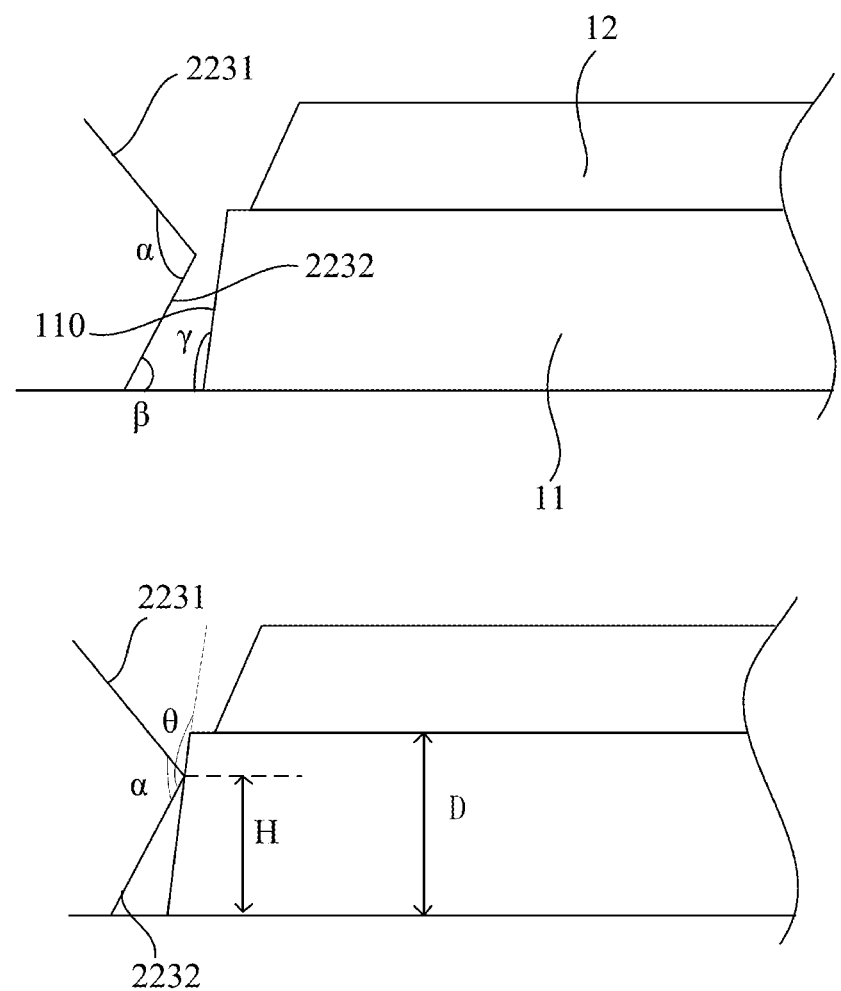

The reason why the first angle α is less than or equal to a sum of the second angle β and the third angle γ will be analyzed by taking FIG. 16 as an example in the following description. As shown in FIG. 16, the position indicated by line OF is an extreme position of the first surface 2231 where the sharp corner of the array substrate 11 does not strike the first surface 2231. If the first surface 2231 exceeds the position, the sharp corner of the array substrate 11 strikes the first surface 2231. Therefore, in order to make the sharp corner of the array substrate 11 keep a certain distance with the first surface 2231, the first angle α shall be less than or equal to an angle θ. According to the exterior angle theorem, the angle θ is equal to the sum of the second angle β and the third angle γ. So, the first angle α is less than or equal to a sum of the second angle β and the third angle γ.

In some embodiments, as shown in FIG. 6, the display apparatus 100 may further include a front frame 3 that surrounds the mold frame 22. The front frame 3 has an opening 30 facing a display area of the display panel 1, and a remaining portion of the front frame 3 covers a peripheral area of the display panel 1.

On this basis, the front frame 3 may be used for fixing the display panel 1 with the backlight module 2, so as to limit the display panel 1 within the accommodating space 220 formed by the mold frame 22. In addition, the front frame 3 may also protect the circuits disposed in the peripheral area of the display panel 1.

Figure 20:
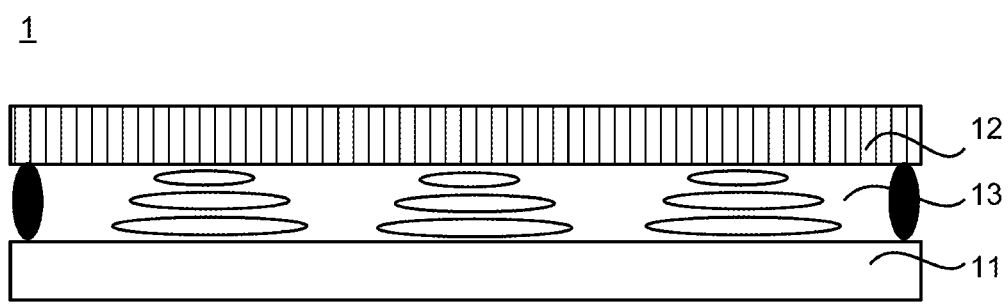
FIG. 20 is a sectional view of a display panel, in accordance with some embodiments of the present disclosure.

In some examples, the display apparatus 100 may be a liquid crystal display (LCD) apparatus, and the display panel 1 may be a liquid crystal display panel. In this case, as shown in FIG. 20, the display panel 1 may include an array substrate 11 and an opposite substrate 12 disposed opposite to the array substrate 11. As shown in FIG. 20, the display panel 1 further includes a liquid crystal layer 13 disposed between the array substrate 11 and the opposite substrate 12. The array substrate 11 and the opposite substrate 12 may be bonded together by an encapsulation sealant, so that the liquid crystal layer 13 is sealed in the space enclosed by the encapsulation sealant.

Figure 21:
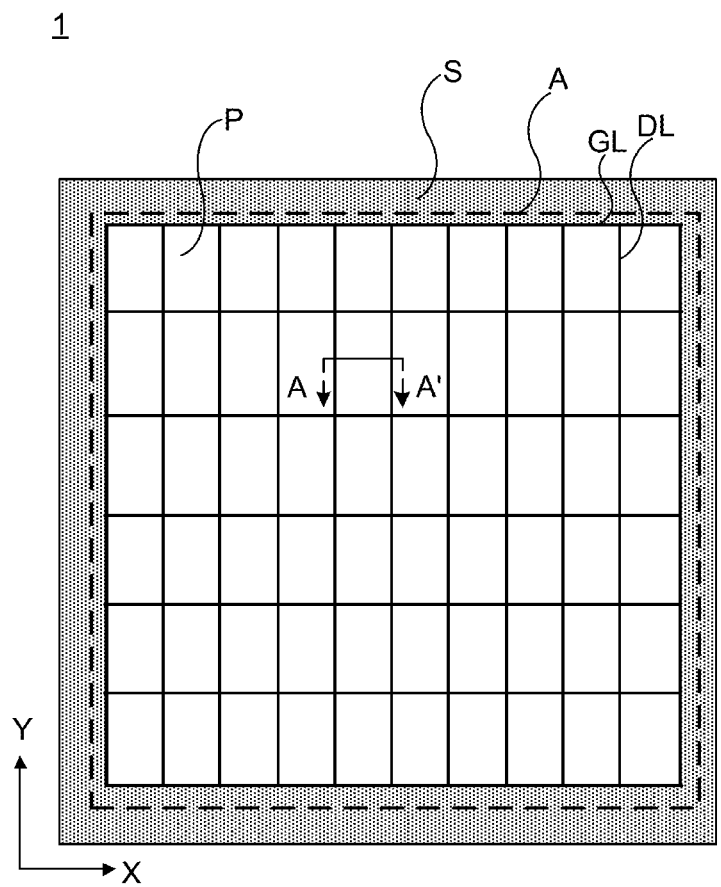
FIG. 21 is a top view of another display panel, in accordance with some embodiments of the present disclosure.

In some embodiments, as shown in FIG. 21, the liquid crystal display panel 1 has a display area A and a peripheral area S located at a periphery of the display area A. For example, the display area A is in a shape of a rectangle, and the peripheral area S may be located on one side, two sides, three sides, or all sides (as shown in FIG. 21) of the display area A. Of course, the display area A may also have other shapes, such as a circular shape. In this case, the peripheral area S may surround the display area A.

In some embodiments, as shown in FIG. 21, the display area A includes a plurality of sub-pixel regions P. and the plurality of sub-pixel regions P may be arranged in an array.

In some examples, as shown in FIG. 21, the liquid crystal display panel 1 includes a plurality of gate lines GL and a plurality of data lines DL located in the display area A. The plurality of gate lines GL extend along a first direction X, and the plurality of data lines DL extend along a second direction Y perpendicular to the first direction X. That is, the gate lines GL and the data lines DL cross, thereby defining the plurality of sub-pixel regions P.

Figure 22:
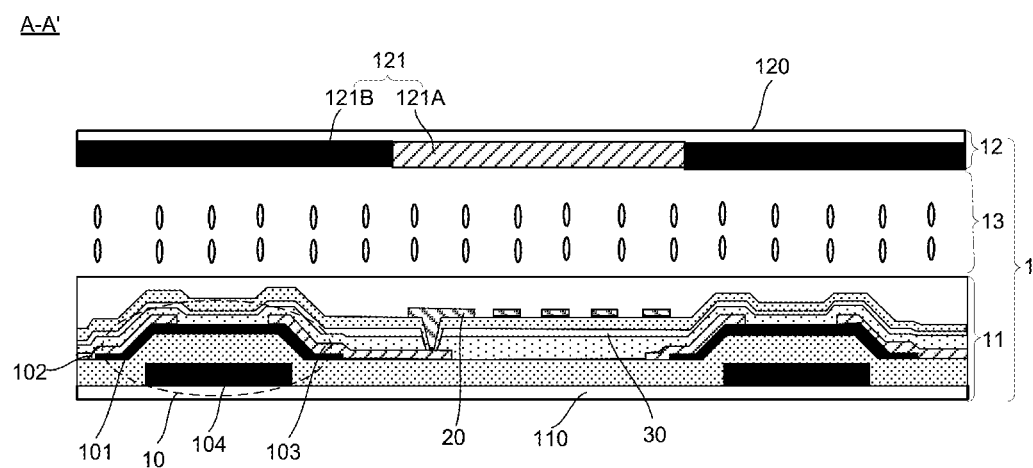
FIG. 22 is a sectional view of the display panel in FIG. 21 along section line A-A'.

As shown in FIG. 22, the array substrate 11 further includes a first base 110, and the gate lines GL and the data lines DL are located on the first base 110. The first base 110 is made of a transparent material, such as glass, quartz, or plastic.

In some embodiments, as shown in FIG. 22, the array substrate 100 further includes thin film transistors 10, pixel electrodes 20, and common electrodes 30. In some other embodiments, the common electrodes 30 may also be disposed in the opposite substrate 12.

In some examples, as shown in FIG. 22, each thin film transistor 10 is disposed in a corresponding sub-pixel region P, and the thin film transistor 10 may include an active layer 101, a source 102, a drain 103, and a gate 104. The source 102 and the drain 103 are in contact with the active layer 101. The gate 104 may be disposed in the same layer as the gate lines GL, and is connected to a corresponding gate line GL. The source 102 and the drain 103 may be disposed in the same layer as the data lines DL, and the source 102 or the drain 103 is connected to a corresponding data line DL. In this way, a gate line GL may be used for turning on or off a corresponding thin film transistor 10. For example, in a case where the thin film transistor 10 is an N-type thin film transistor, if a high-level signal is provided to the thin film transistor 10 through the gate line GL, the thin film transistor 10 is turned on; and if a low-level signal is provided to the thin film transistor 10 through the gate line GL, the thin film transistor 10 is turned off.

In some examples, as shown in FIG. 22, the pixel electrode 20 is electrically connected to a drain 103 of a corresponding thin film transistor 10. In this way, in a case where the corresponding thin film transistor 10 is turned on, data signals provided through the data line DL may be provided to the pixel electrode 20.

In some embodiments, the pixel electrodes 20 are in one-to-one correspondence with the common electrodes 30. In some examples, as shown in FIG. 22, the pixel electrodes 20 and the common electrodes 30 may be disposed in different layers. In some other examples, the pixel electrodes 20 and the common electrodes 30 may be disposed in a same layer. In this case, the pixel electrodes 20 and the common electrodes 30 both have comb structures each of which includes a plurality of strip-shaped sub-electrodes.

It will be noted that, an electric field will be generated between a pixel electrode 20 and a corresponding common electrode 30 when the thin film transistor 2 is turned on, and the electric field may drive liquid crystal molecules in the liquid crystal layer 13 to deflect, so that the liquid crystal display apparatus may realize image display.

In some embodiments, as shown in FIG. 22, the opposite substrate 12 may include a second base 120 and a color filter layer 121 disposed on the second base 120. In this case, the opposite substrate 12 is called a color filter (CF) substrate. The color filter layer 121 includes a plurality of color photoresist units 121A and a black matrix 121B formed between the color photoresist units 121A. The plurality of color photoresist units 121A may include photoresist units 121A of a plurality of colors which are in one-to-one correspondence with sub-pixel regions of the array substrate 11. For example, the plurality of color photoresist units 121A include at least red photoresist units, green photoresist units and blue photoresist units. The black matrix 121B is used to separate the red photoresist units, the green photoresist units and the blue photoresist units, so as to avoid crosstalk between light emitted from adjacent sub-pixel regions.

The forgoing descriptions are merely specific implementation manners of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A mold frame, comprising:
a bottom frame having an opening;
a side frame disposed on a periphery of the bottom frame;
at least one position-limiting structure disposed on a first inner side wall of the side frame; and
fixing members each of which is connected to the side frame and/or the bottom frame, the fixing members being configured to fix the mold frame, wherein
the position-limiting structure has a first side wall that is in direct contact with the first inner side wall of the side frame, and a second side wall opposite to the first side wall; the second side wall includes two surfaces that are arranged along a thickness direction of the bottom frame, and the two surfaces are connected; at least one of the two surfaces is inclined with respect to the first side wall, and a first angle, facing the first side wall, between two planes where the two surfaces are located is an obtuse angle; and
each fixing member includes:
a first support plate including:
a horizontal portion parallel to a first surface of the bottom frame directly connected to the first inner side wall, one end of the horizontal portion is connected to a corresponding outer side wall of the side frame, and an opposite end of the horizontal portion is connected to a vertical portion; and
the vertical portion extending along the thickness direction of the bottom frame; and
a second support plate connected to a second surface of the bottom frame opposite to the first surface of the bottom frame, and extending along the thickness direction of the bottom frame, so that the fixing member, the side frame and the bottom frame constitute a U-shaped structure.

2. The mold frame according to claim 1, wherein the at least one position-limiting structure includes a plurality of position-limiting structures which are spaced apart.

3. The mold frame according to claim 2, wherein at least one of the plurality of position-limiting structures is disposed at a corner of the side frame.

4. The mold frame according to claim 1, wherein the at least one position-limiting structure includes one position-limiting structure extending along a length direction of the first inner side wall of the side frame to two ends of the first inner side wall, and the one position-limiting structure is connected to position-limiting structures disposed on second and third inner side walls, adjacent to the first inner side wall, of the side frame.

5. The mold frame according to claim 1, wherein the at least one position-limiting structure, the bottom frame, the side frame and the fixing members are integrally formed.

6. The mold frame according to claim 1, wherein one of the two surfaces is parallel to the first side wall, and another surface of the two surfaces is inclined with respect to the first side wall.

7. The mold frame according to claim 1, wherein the two surfaces are connected through a curved surface, and an orthographic projection of the curved surface on a plane perpendicular to both the first side wall and a first surface of the bottom frame directly connected to the first side wall is a curved line segment that has a radius of curvature that ranges from approximately 0.5 mm to approximately 2 mm.

8. The mold frame according to claim 1, wherein the first angle ranges from approximately 150 degrees to approximately 160 degrees.

9. The mold frame according to claim 1, wherein the at least one position-limiting structure, the bottom frame and the side frame are integrally formed.

10. A backlight module, comprising:
the mold frame according to claim 1;
a back plate matched with the mold frame, the back plate being disposed on a side of the bottom frame away from the side frame; and
a backlight assembly disposed within an accommodating space enclosed by the back plate and the mold frame.

11. A display apparatus, comprising:
the backlight module according to claim 10; and
a display panel disposed within another accommodating space enclosed by the bottom frame and the side frame, wherein
the position-limiting structure is configured to limit a position of the display panel.

12. The display apparatus according to claim 11, wherein the display panel is a liquid crystal display panel, and the liquid crystal display panel includes an array substrate and an opposite substrate that are sequentially arranged in a direction away from the bottom frame.

13. The display apparatus according to claim 12, wherein in the thickness direction of the bottom frame, a first distance between a line at which the two planes where the two surfaces are located intersect and a first surface of the bottom frame directly connected to the first inner side wall is less than a second distance between a surface of the array substrate facing away from the bottom frame and the first surface of the bottom frame.

14. The display apparatus according to claim 13, wherein the first distance is n times the second distance, wherein n ranges from approximately 0.5 to approximately 0.8.

15. The display apparatus according to claim 13, wherein an edge of the opposite substrate exceeds a corresponding edge of the array substrate;
the two surfaces of the second side wall include a first surface and a second surface that is connected to the first surface of the bottom frame;
the first angle is less than $$\left[180° - \arctan\left(\frac{\Delta d}{D-H}\right) - (90° - \beta)\right]$$

degrees,
wherein H is the first distance, is the second distance; β is a second angle, facing the array substrate, between a first plane where the second surface is located and the first surface of the bottom frame; and Δd is a horizontal distance between the edge of the opposite substrate and a line segment at which the second side wall comes into contact with a side face of the array substrate after the liquid crystal display panel abuts against the position-limiting structure.

16. The display apparatus according to claim 13, wherein an edge of the array substrate exceeds a corresponding edge of the opposite substrate;
the two surfaces of the second side wall include a first surface and a second surface that is connected to the first surface of the bottom frame; and
the first angle is less than or equal to a sum of a second angle, facing the array substrate, between a first plane where the second surface is located and the first surface of the bottom frame, and a third angle, facing the position-limiting structure, between the first surface of the bottom frame and a side face of the array substrate.

17. The display apparatus according to claim 13, wherein the two surfaces of the second side wall include a first surface and a second surface that is connected to the first surface of the bottom frame; and
a sum of a second angle, facing the array substrate, between a first plane where the second surface is located and the first surface of the bottom frame, and a third angle, facing the position-limiting structure, between the first surface of the bottom frame and a side face of the array substrate is less than or equal to 180 degrees.

18. The display apparatus according to claim 11, further comprising a front frame surrounding the back plate, wherein
the front frame has an opening facing a display area of the display panel, and a remaining portion of the front frame covers a peripheral area of the display panel.

19. A mold frame, comprising:
a bottom frame having an opening;
a side frame disposed on a periphery of the bottom frame; and
at least one position-limiting structure disposed on a first inner side wall of the side frame, wherein
the position-limiting structure has a first side wall that is in direct contact with the first inner side wall of the side frame, and a second side wall opposite to the first side wall; the second side wall includes two surfaces that are arranged along a thickness direction of the bottom frame, and the two surfaces are connected; at least one of the two surfaces is inclined with respect to the first side wall, and a first angle, facing the first side wall, between two planes where the two surfaces are located is an obtuse angle;
the two surfaces are connected through a curved surface, and an orthographic projection of the curved surface on a plane perpendicular to both the first side wall and a first surface of the bottom frame directly connected to the first side wall is a curved line segment that has a radius of curvature that ranges from approximately 0.5 mm to approximately 2 mm.

20. A mold frame, comprising:
a bottom frame having an opening;
a side frame disposed on a periphery of the bottom frame; and
at least one position-limiting structure disposed on a first inner side wall of the side frame, wherein
the position-limiting structure has a first side wall that is in direct contact with the first inner side wall of the side frame, and a second side wall opposite to the first side wall; the second side wall includes two surfaces that are arranged along a thickness direction of the bottom frame, and the two surfaces are connected; at least one of the two surfaces is inclined with respect to the first side wall, and a first angle, facing the first side wall, between two planes where the two surfaces are located is an obtuse angle; and
the first angle ranges from approximately 150 degrees to approximately 160 degrees.

\* \* \* \* \*